United States Patent

Ooms et al.

[11] Patent Number: 5,942,557
[45] Date of Patent: Aug. 24, 1999

[54] LOW COEFFICIENT OF FRICTION SILICONE RELEASE FORMULATIONS

[75] Inventors: Marco Ooms, Halsteren; Uwe Adler, Hoogerheide, both of Netherlands

[73] Assignee: General Electric Company, Pittsfield, Mass.

[21] Appl. No.: 08/933,964

[22] Filed: Sep. 19, 1997

[51] Int. Cl.$^6$ ........................................ C08J 3/28
[52] U.S. Cl. ................ 522/77; 522/83; 522/148
[58] Field of Search .............................. 522/77, 83, 148, 522/170

[56] References Cited

U.S. PATENT DOCUMENTS

| | | |
|---|---|---|
| 4,279,717 | 7/1981 | Eckberg et al. . |
| 4,421,904 | 12/1983 | Eckberg et al. . |
| 4,977,198 | 12/1990 | Eckberg . |
| 5,085,924 | 2/1992 | Eckberg ................... 428/209 |
| 5,258,480 | 11/1993 | Eckberg et al. ............. 528/15 |
| 5,360,833 | 11/1994 | Eckberg et al. ............. 522/31 |
| 5,376,420 | 12/1994 | Yamamoto et al. .......... 428/40 |
| 5,397,813 | 3/1995 | Eckberg et al. . |
| 5,482,780 | 1/1996 | Wilkie et al. . |
| 5,691,401 | 11/1997 | Morita et al. ............. 523/435 |

FOREIGN PATENT DOCUMENTS

| | | |
|---|---|---|
| 0 471 589 A2 | 2/1992 | European Pat. Off. . |
| 04117456 | 4/1992 | Japan . |
| WO 96/18497 | 6/1996 | WIPO . |

*Primary Examiner*—Nathan M. Nutter

[57] ABSTRACT

A method of reducing coefficient of friction of a silicone release coating and a corresponding a low coefficient of friction release coating composition are disclosed. The low coefficient of friction release coating composition includes: (a) an epoxy functional polyorganosiloxane; (b) a fine particle silicone resin; and (c) a photoinitiator.

13 Claims, No Drawings

LOW COEFFICIENT OF FRICTION SILICONE RELEASE FORMULATIONS

FIELD OF THE INVENTION

The invention relates to silicone release coatings.

BACKGROUND OF THE INVENTION

Release coatings are useful for many applications whenever it is necessary to provide a surface or material which is relatively non-adherent to other materials which would normally adhere thereto. Silicone paper release compositions are widely used as coatings which release pressure-sensitive adhesives for labels, decorative laminates, transfer tapes, etc. Silicone release coatings on paper, polyethylene, Mylar and other such substrates are also useful as non-stick surfaces for food handling and industrial packaging applications.

For example, when labels are coated with an adhesive, it is desirable that the paper backing be easily peeled away from the label when it is ready for use, yet the adhesive quality of the label should not be reduced by peeling it away from the substrate upon which it was stored. The same principle applies to certain types of adhesive tapes which come in rolls. It is necessary that the tape unroll easily and still maintains its adhesive characteristics. This can be accomplished by coating the non-adhesive side of the tape with a silicone release composition which will come into contact with the adhesive as the roll of tape is manufactured.

Substrates coated with standard silicone release formulations have a relatively high coefficient of friction. When a coated substrate is transported on static steel rolls, obstruction of the rolls and deformation of the coated substrate can occur, due to the high coefficient of friction. The formulation of this invention reduces the coefficient of friction to a very low value, while substantially maintaining the release properties of the silicone release coating. This allows transport of a fully effective silicone release coated substrate on, for example, static steel rolls without any problems.

Most silicone release coatings have a glossy surface. An additional feature of the silicone release coatings obtained from the invention is a mattee finish surface, which is advantageous for use in applications such as decorative films, as the matte finish allows the adhesive to be repositioned.

SUMMARY OF THE INVENTION

In one aspect, the invention relates to a low coefficient of friction release coating composition comprising: (a) 1000 parts by weight of an epoxy functional polyorganosiloxane; (b) 1–100 parts by weight of a highly crosslinked fine particle silicone resin; and (c) 5–50 parts by weight of a photoinitiator.

In another aspect, the invention relates to a method of reducing coefficient of friction of a silicone release coating, comprising adding spherical silicone resin particles to the silicone release coating, whereby the coefficient of friction is reduced by at least two-fold while the release value is reduced by less than two-fold.

In another aspect, the invention relates to a substrate coated with low coefficient of friction release coating formulation.

DETAILED DESCRIPTION OF THE INVENTION

In its most basic aspect, the invention relates to a method for reducing the coefficient of friction of a silicone release coating without changing the original release properties of the silicone release coating and to a corresponding composition for a release coating with a low coefficient of friction. The improved release coating comprises: (a) an epoxy functional polyorganosiloxane, (b) a fine particle silicone resin, and (c) a photoinitiator.

The epoxy functional polyorganosiloxane can be any of the well-known members of this class. Epoxy functional polyorganosiloxanes suitable for use as silicone release coatings are described in U.S. Pat. Nos. 4,279,717, 4,421,904, 4,977,158, 5,085,924, 5,258,480, 5,360,833 and 5,397,813, the disclosures of which are incorporated herein by reference.

The fine particle silicone resin, commercially available from Toshiba Silicone Co., Ltd. (Japan) as TOSPEARL™ silicone resin, is composed of a highly crosslinked silicone resin obtained by controlled hydrolysis crosslinking of methyltrimethoxysilane which results in a resin with a network structure in which siloxane bonds extend three-dimensionally. The particles are spherical and characterized by a narrow particle size distribution. "Spherical" as used herein means that the diameter of the particle measured at any point varies by less than 10% from the diameter measured at any other point. The particle size ranges from about 0.5–12 $\mu$m, and preferably 2–4.5 $\mu$m.

Suitable photoinitiators for curing of the compositions of the present invention are described in U.S. Pat. No. 4,279,717, referenced above. These initiators are iodonium salts with structural modifications which render them compatible with epoxy-functional silicones.

An example of such a low coefficient of friction release coating formulation is:

(a) 1000 parts by weight epoxy functional polyorganosiloxane;

(b) 1–100 parts by weight fine particle silicone resin; and (c) 5–50 parts by weight photoinitiator.

In many preferred embodiments the level of fine particle silicone resin is 1 to 50 part by weight acid to 1000 parts by weight of epoxy functional polyorganosiloxane, and in a particularly preferred embodiment, the fine particle silicone resin is present at about 2 parts by weight per 1000 parts by weight, or 0.2%, of epoxy functional polyorganosiloxane.

Coefficient of Friction

To demonstrate the efficacy of the low coefficient of friction release coating system of the invention, standard release coating formulations with and without 0.2% of a fine particle silicone resin were prepared, coated on a suitable substrate, cured by exposure to focused UV light, and the coefficient of friction determined.

The starting formulations of the release coating were:

100 parts by weight of epoxy functional polyorganosiloxane 2 parts photoinitiator 0.2 parts fine particle silicone resin The photoinitiator employed in the test compositions was UV9380C, a cationic photoinitiator activated by UV radiation.

The components were thoroughly mixed, applied to a polyester (PET) substrate at a coatweight of about 1 gram per square meter using a Dixon coater, and cured under 300 W/in Fusion H ultraviolet lamps at a line speed of 15 meters per minute. Table 1 shows the results of the testing of the standard formulations and the standard formulations with 0.2% fine particle silicone resin.

The following definitions and abbreviations are employed in the Tables:

The epoxy-functional siloxanes used are solventless UV curable polymers (commerical designations UV9300, UV9315 and UV9400, available from General Electric Silicones) and a photocurable epoxy silicone polymer composition (commerical designation UV9500, available from General Electric Silicones). They may be generically described as dimethylepoxysilyloxy-stopped linear polydimethyl-methylepoxysiloxane, where the epoxy group is a 3,4-epoxy-2-ethyl-cyclohexyl group. The composition of the photocurable epoxy silicone polymer (commercial designation UV9500) is taught in U.S. Pat. No. 5,397,813.

T120 is TOSPEARL™ silicone resin 120, a fine particle silicone resin commercially available from Toshiba Silicone Co., Ltd.

TABLE 1

| PRODUCT FORMULATION | COEFFICIENT OF FRICTION (no units) |
| --- | --- |
| UV9500 + 0.2% T120 | 0.356 |
| UV9400 + 0.2% T120 | 0.277 |
| UV9315 + 0.2% T120 | 0.313 |
| UV9500 | 1.605 |
| UV9400 | Out of Scale |
| UV9315 | 1.216 |

From Table 1, it can be seen that the coefficient of friction of the release coating was dramatically lower for the compositions with the fine particle silicone resin. The coefficient of friction was reduced over the controls by a factor of at least three. It should be clear to those skilled in the art that high release epoxy-silicone compositions such as those taught in U.S. Pat. No. 5,360,833 may also be treated with low concentrations of fine particle silicone resin for the purpose of reducing the coefficient of friction of cured coatings of such materials.

Release Values

The effect of incorporating fine particle silicone resin on release properties of the coating was determined. Various levels of fine particle silicone resin, from 1 to 50 parts per 1000 were added to the formulation, as shown in Table 2. The standard formulation described previously was used. The coating was applied to a biaxially oriented polypropylene (BOPP) substrate and cured. Laminates of a pressure sensitive adhesive tape and BOPP substrate coated with the experimental formulations were prepared and the release values were determined by using an IMASS Slip/Peel tester. The results are shown in Table 2.

The following definitions and abbreviations are employed in the Table:

UV9315 is the commercial designation of a polysiloxane described above. It is available from General Electric Silicones.

TESE 7475, TESE 4154, and TESA 7476 are commercially available acrylic pressure sensitive adhesive tapes available from Beiersdorf AG, Hamburg, Germany.

T120 is TOSPEARL™ silicone resin 120, a fine particle silicone resin commercially available from Toshiba Silicone Co., Ltd.

TABLE 2

| | RELEASE VALUE, cN/mm | | | | | |
| --- | --- | --- | --- | --- | --- | --- |
| | TESE7475 | | TESE4154 | | TESA7476 | |
| PRODUCT FORMULATION | 1 Day | 7 Days | 1 Day | 7 Days | 1 Day | 7 Days |
| UV9315 + 0.1% T120 | 6 | 8 | 14 | 19 | 28 | 45 |
| UV9315 + 0.5% T120 | 10 | 13 | 27 | 28 | 35 | 51 |
| UV9315 + 1.0% T120 | 6 | 9 | 18 | 20 | 29 | 45 |
| UV9315 + 2.0% T120 | 8 | 10 | 24 | 30 | 35 | 55 |
| UV9315 + 5.0% T120 | 9 | 11 | 25 | 28 | 35 | 60 |
| UV9315 | 8 | 10 | 15 | 23 | 33 | 58 |
| UV9315 + 0.1% T120 | 18 | 14 | 8 | 24 | 32 | 52 |
| UV9315 + 0.5% T120 | 29 | 17 | 12 | 35 | 38 | 60 |
| UV9315 + 1.0% T120 | 20 | 10 | 7 | 25 | 34 | 52 |
| UV9315 + 2.0% T120 | 34 | 13 | 8 | 44 | 41 | 72 |
| UV9315 + 5.0% T120 | 36 | 13 | 10 | 40 | 42 | 62 |
| UV9315 | 18 | 11 | 9 | 23 | 38 | 59 |

From Table 2, it is apparent that the addition of up to 5% fine particle silicone resin does not materially affect the release value of the coating for any of the pressure sensitive adhesives tested, under normal aging conditions.

Although this invention is susceptible to an embodiment in many different forms, preferred embodiments of the invention are described above. It should be understood, however, that the present disclosure is to be considered as an exemplification of the principles of this invention and is not intended to limit the invention to the embodiments described. The particular epoxy functional polyorganosiloxanes shown above in the examples were chosen simply on the basis of their ready commercial availability and cost. Similarly, other compatible cationic photoinitiators would function analogously to that illustrated above; it was also chosen on the basis of its ready availability and cost.

For the preparation of a low coefficient of friction silicone release coating composition, one mixes an epoxy functional polyorganosiloxane, a photoinitiator, and a fine particle silicone resin. A coated article is prepared by mixing the components, spreading the coating composition on the substrate and curing the coated article by exposure to ultraviolet light, all of which are carried out by means well known in the art.

We claim:

1. A release coating composition comprising:
   (a) 1000 parts by weight epoxy functional polyorganosiloxane;
   (b) 1–100 parts by weight spherical particle silicone resin comprising a highly crosslinked silicone resin obtained by controlled hydrolysis crosslinking of methyltrimethoxysilane which results in a resin with a network structure in which siloxane bonds extend three-dimensionally, having a particle size of from 0.5–12 μm; and
   (c) 5–50 parts by weight photoinitiator.

2. The composition of claim 1 wherein said polyorganosiloxane is dialkyl epoxysiloxy chain-stopped polydialkyl-alkylepoxy siloxane.

3. A release coating composition comprising:
   (a) 1000 parts by weight epoxy functional polyorganosiloxane;
   (b) 1–50 parts by weight spherical particle silicone resin comprising highly crosslinked silicone resin obtained by controlled hydrolysis crosslinking of methyltrimethoxysilane which results in a resin with a network structure in which siloxane bonds extend three-dimensionally, having a particle size of from 0.5–12 μm; and (c) 10–30 parts by weight photoinitiator.

4. The composition of claim 3 wherein said polyorganosiloxane is dialkyl epoxysiloxy chain-stopped polydialkyl-alkylepoxy siloxane.

5. The composition of claim 3 wherein the particle size of said silicone particle is 2–4.5 μm.

6. A release coating composition comprising:
   (a) 1000 parts by weight epoxy functional polyorganosiloxane;
   (b) 2 parts by weight spherical particle silicone resin comprising a highly crosslinked silicone resin obtained by controlled hydrolysis crosslinking of methyltri-methoyxsilane which results in a resin with a network structure in which siloxane bonds extend three-dimensionally, having a particle size of from 0.5–12 μm; and
   (c) 20 parts by weight photoinitiator.

7. The composition of claim 7 wherein said polyorganosiloxane is dialkyl epoxysiloxy chain-stopped polydialkyl-alkylepoxy siloxane.

8. The composition of claim 6 wherein the particle size of said silicone particle is 2 μm.

9. A method of reducing coefficient of friction of a silicone release coating, comprising adding to said silicone release coating from 1 to 100 parts by weight of spherical silicone resin particles per 1000 parts of said silicone release coating.

10. An article comprising a substrate and a coating on the substrate, said coating obtained by curing a release coating composition comprising:
    (a) 1000 parts by weight epoxy functional polyorganosiloxane;
    (b) 1–100 parts by weight spherical particle silicone resin comprising a highly crosslinked silicone resin obtained by controlled hydrolysis crosslinking of methyltri-methoxysilane which results in a resin with a network structure in which siloxane bonds extend three-dimensionally, having a particle size of from 0.5–12 μm; and
    (c) 5–50 parts by weight photoinitiator.

11. The composition of claim 1 wherein said polyorganosiloxane is dimethylepoxysiloxy chain-stopped polydimethyl-methylepoxy siloxane.

12. The composition of claim 3 wherein said polyorganosiloxane is dimethylepoxysiloxy chain-stopped polydimethyl-methylepoxy siloxane.

13. The composition of claim 6 wherein said polyorganosiloxane is dimethylepoxysiloxy chain-stopped polydimethyl-methylepoxy siloxane.

* * * * *